(12) United States Patent
Liao (10) Patent No.: US 6,452,821 B1
(45) Date of Patent: Sep. 17, 2002

(54) VOLTAGE-TRANSFORMING DEVICE HAVING A WIRE-WINDING MECHANISM

(76) Inventor: Sheng Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 0 days.

(21) Appl. No.: 09/935,645

(22) Filed: Aug. 24, 2001

Related U.S. Application Data (63) Continuation-in-part of application No. 09/696,035, filed on Oct. 26, 2000, now Pat. No. 6,304,476.

(51) Int. Cl.[7] .................................................. H02M 1/00
(52) U.S. Cl. ........................................................ 363/146
(58) Field of Search ................................. 363/144, 146; 191/12, 12.2 R, 12.4

(56) References Cited

U.S. PATENT DOCUMENTS

| | | | | |
|---|---|---|---|---|
| 4,559,575 A | * | 12/1985 | Noto et al. ................. | 360/133 |
| 6,176,358 B1 | * | 1/2001 | Hsin ...................... | 191/12.2 R |
| 6,199,674 B1 | * | 3/2001 | Liao ........................... | 191/12.4 |
| 6,342,999 B1 | * | 1/2002 | Liao ........................... | 361/118 |

* cited by examiner

Primary Examiner—Matthew Nguyen (57) ABSTRACT

The present invention proposes a voltage-transforming device having a wire-winding mechanism. The wire-winding mechanism comprises a box body, a wire-winding disk, and a scroll spring. The box body has a wire tank therein. The wire-winding disk has a first disk body. Receiving grooves and wire-winding rings are disposed on two faces of the first disk body, respectively. The wire-winding disk is pivotally disposed on a projective shaft on an inside face of the wire tank through an axial hole. The power cord is wound around the projective shaft and situated in the receiving grooves of the wire-winding disk. The power cord is also wound around the wire-winding rings of the wire-winding disk. Therefore, the power cord is disposed in the receiving grooves and around the wire-winding rings of the two faces of the first disk body, respectively. The length of the power cord can thus be adjusted according to necessity.

18 Claims, 14 Drawing Sheets

VOLTAGE-TRANSFORMING DEVICE HAVING A WIRE-WINDING MECHANISM

RELATED U.S. PATENT APPLICATIONS

This Patent Application is being filed as a Continuation-in-Part of U.S. patent application Ser. No. 09/696,035, filed at the U.S. PTO on Oct. 26, 2000 now U.S. Pat. No. 6,304,476.

FIELD OF THE INVENTION

The present invention relates to a voltage-transforming device having a wire-winding mechanism and, more particularly, to a voltage-transforming device having an automatically-winding power cord whose length can be adjusted according to necessity so that entanglement of wire due to a too-long length of external wire or inconvenience of use due to a too-short length of external wire will not arise. Moreover, the area of use of the wire-winding mechanism can be greatly increased to receive a longer power cord.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external communication wire or inconvenience of use due to a too-short length of external communication wire, several kinds of wire-winding boxes applicable to various kinds of communications apparatuses have been proposed. Most of the wire-winding boxes comprise a box body, a housing, a communication wire, two wire-winding disks, and two scroll springs. Thereby, the plug of the communication wire can be plugged on sockets of relevant communications apparatuses to accomplish communications of information.

Additionally, a communication wire may show a tight state due to resiliency of the scroll spring when it is pulled out from a conventional wire-winding box so that a proper length of the communication wire cannot be kept outside, resulting in much trouble in use for the user. Therefore, several kinds of wire-winding boxes capable of positioning the pulled-out communication wire in time have been proposed, wherein a swing sheet capable of resiliently swinging and gaps disposed at the periphery of a rotating disk and matched with retaining grooves are exploited to generate winding or positioning function.

It is inevitable to use voltage-transforming devices such as voltage-transforming rectifiers, switching transformers, and car chargers in present communications apparatuses. However, prior art wire-winding boxes are not suitable to voltage-transforming devices. Moreover, for the power cord of a voltage-transforming device to be practical in use, it must have a certain length. But if it is too long or too short, entanglement of wire or inconvenience of use may arise.

Accordingly, the above voltage-transforming device has inconvenience and drawbacks in practical use. The present invention aims to resolve the problems in the prior art.

SUMMARY OF THE INVENTION

The primary object of the present invention is to provide a voltage-transforming device having a wire-winding mechanism, whereby a power cord of a long length can be wound and received therein. The power cord can be pulled out directly from the voltage-transforming device. A certain restoring tensile force can be kept due to the action of the scroll spring on the power cord so that the power cord can be rewound into the voltage-transforming device successfully. Thereby, entanglement of wire due to a too-long length of external wire or inconvenience of use due to a too-short length of external wire will not arise. Moreover, the power cord is respectively disposed in receiving grooves and around wire-winding rings of two faces of a first disk body of a wire-winding disk so that the power cord is less restricted when being wound around the wire-winding disk. Therefore, the area of use of the wire-winding mechanism can be greatly increased to receive a longer power cord, hence achieving convenient use of the wire-winding mechanism.

To achieve the above object, the present invention provides a voltage-transforming device having a wire-winding mechanism. The voltage-transforming device of the present invention comprises a housing, a voltage-transforming circuit unit, and a wire-winding mechanism. The voltage-transforming circuit unit is installed in the housing and is connected to a power cord. The wire-winding mechanism comprises a box body, a wire-winding disk, and a scroll spring. The box body is installed in the housing and has a wire tank therein. The wire-winding disk is pivotally installed in the wire tank. The wire-winding disk has a first disk body. Receiving grooves and wire-winding rings are disposed on two faces of the first disk body, respectively. The power cord is disposed in the receiving grooves and around the wire-winding rings of the two faces of the first disk body. One end of the power cord can protrude out of the box body. The scroll spring is installed in the box body and is connected to the wire-winding disk. A voltage-transforming device having a wire-winding mechanism is thus formed.

The various objects and advantages of the present invention will be more readily understood from the following detailed description when read in conjunction with the appended drawings, in which:

DETAILED DESCRIPTION OF THE PREFERRED EMBODIMENTS

FIGS. 1 to 4 show a voltage-transforming device having a wire-winding mechanism according to a preferred embodiment of the present invention. The voltage-transforming device in this embodiment is a voltage-transforming rectifier. The voltage-transforming device comprises a housing 10. A voltage-transforming circuit unit 11 is installed in the housing 10. The input terminal of the voltage-transforming circuit unit 11 is connected to an input plug 12, and the output terminal thereof is connected to a power cord 14. The other end of the power cord 14 is connected to an output plug 13. The input plug 12 can be plugged into a 110V or 220 AC socket. Through the action of the voltage-transforming circuit unit 11, a DC voltage is transferred via the power cord 14 to the output plug 13, which can then be plugged into an electric apparatus to provide the required electricity. Because the structure of the above voltage-transforming device is the same as the prior art structure, it will not be further described.

Figure 7:
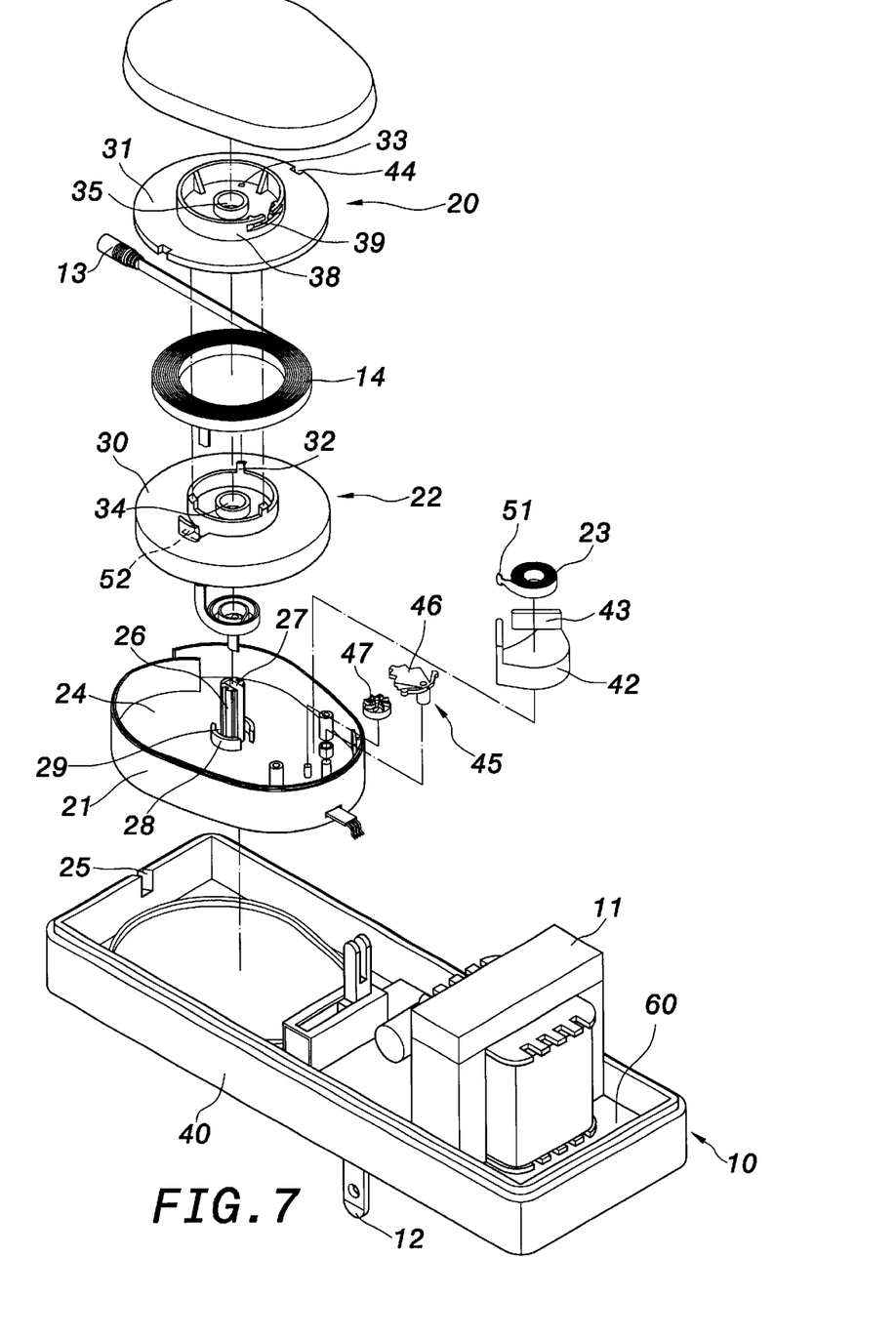
FIG. 7 is an exploded perspective view of a second embodiment of the present invention.

In the present invention, a wire-winding mechanism 20 is installed in the housing 10. The wire-winding mechanism 20 is situated between the output terminal of the voltage-transforming circuit unit 11 and the output plug 13. The wire-winding mechanism 20 comprises a box body 21, a wire-winding disk 22, and a scroll spring 23. The box body 21 can be integrally formed in the housing 10, or can be a separate unit to be assembled in the housing 10 (as shown in FIG. 7). A concave wire tank 24 is formed in the box body 21. The power cord 14 is designed to be a flat wire and properly wound to be matched in the wire tank 24 of the box body 21. A wire hole 25 letting one end of the power cord 14 protrude out is formed at a predetermined place on a side of the wire tank 24. A projective shaft 26 is installed at the center of the inner side surface of the wire tank 24. A through groove 27 is axially formed on the projective shaft 26. The through groove 27 extends to the bottom of the wire tank 24 and penetrates to one side adjacent to the voltage-transforming circuit unit 11. At least a positioning element 28 is installed on the inner side surface of the wire tank 24 (two positioning elements 28 are provided in this embodiment). The positioning element 28 is a circular arc plate surrounding the projective shaft 26 at a predetermined distance so that a positioning groove 29 is formed between the positioning element 28 and the projective shaft 26. One end of the power cord 14 penetrates through the through groove 27 on the projective shaft 26 in the wire tank 24. After the power cord 14 penetrates through the through groove 27, it can pass through the positioning groove 29 to be clamped and positioned through the positioning groove 29.

Figure 1:
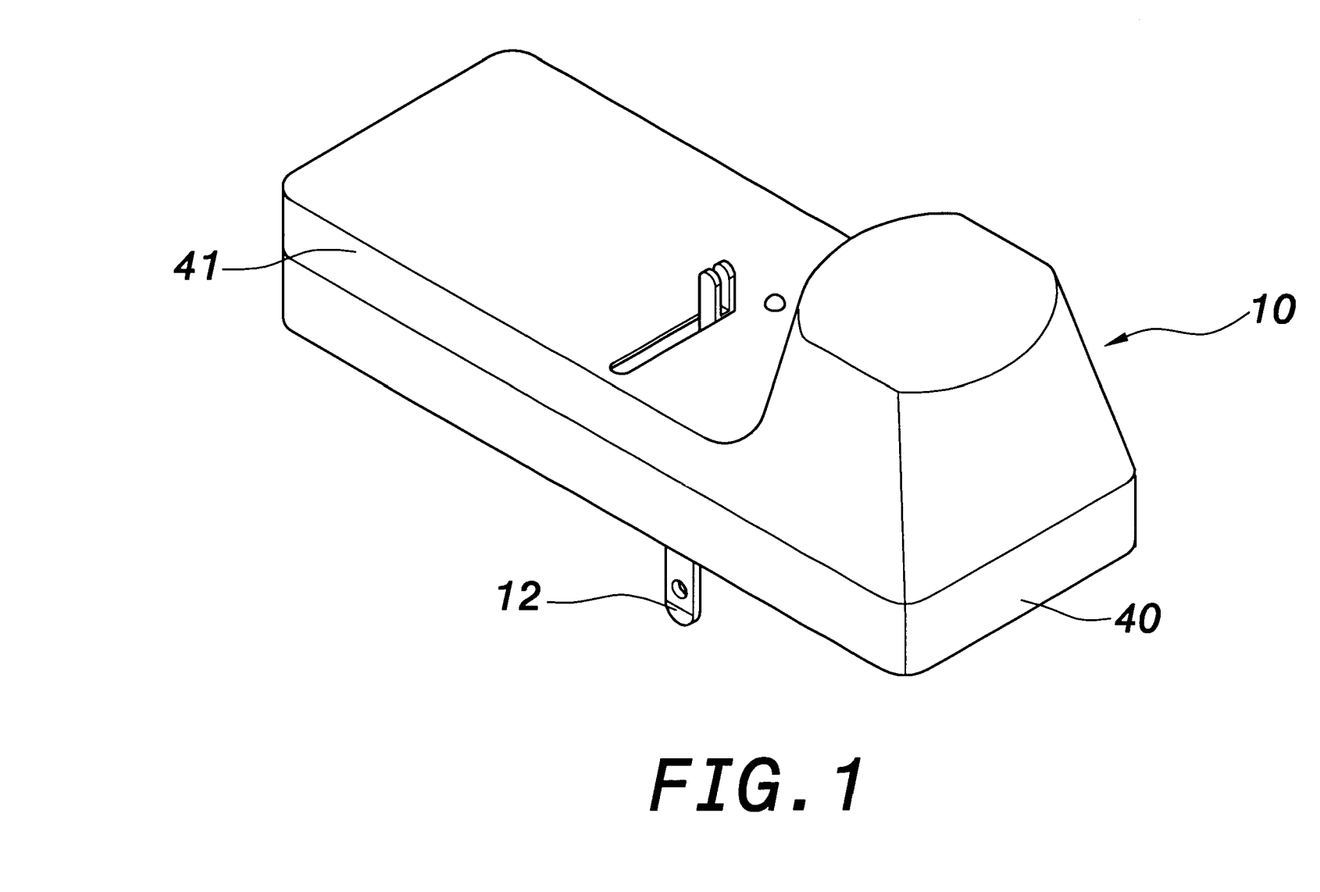
FIG. 1 is a perspective view of a first embodiment of the present invention.
Figure 2:
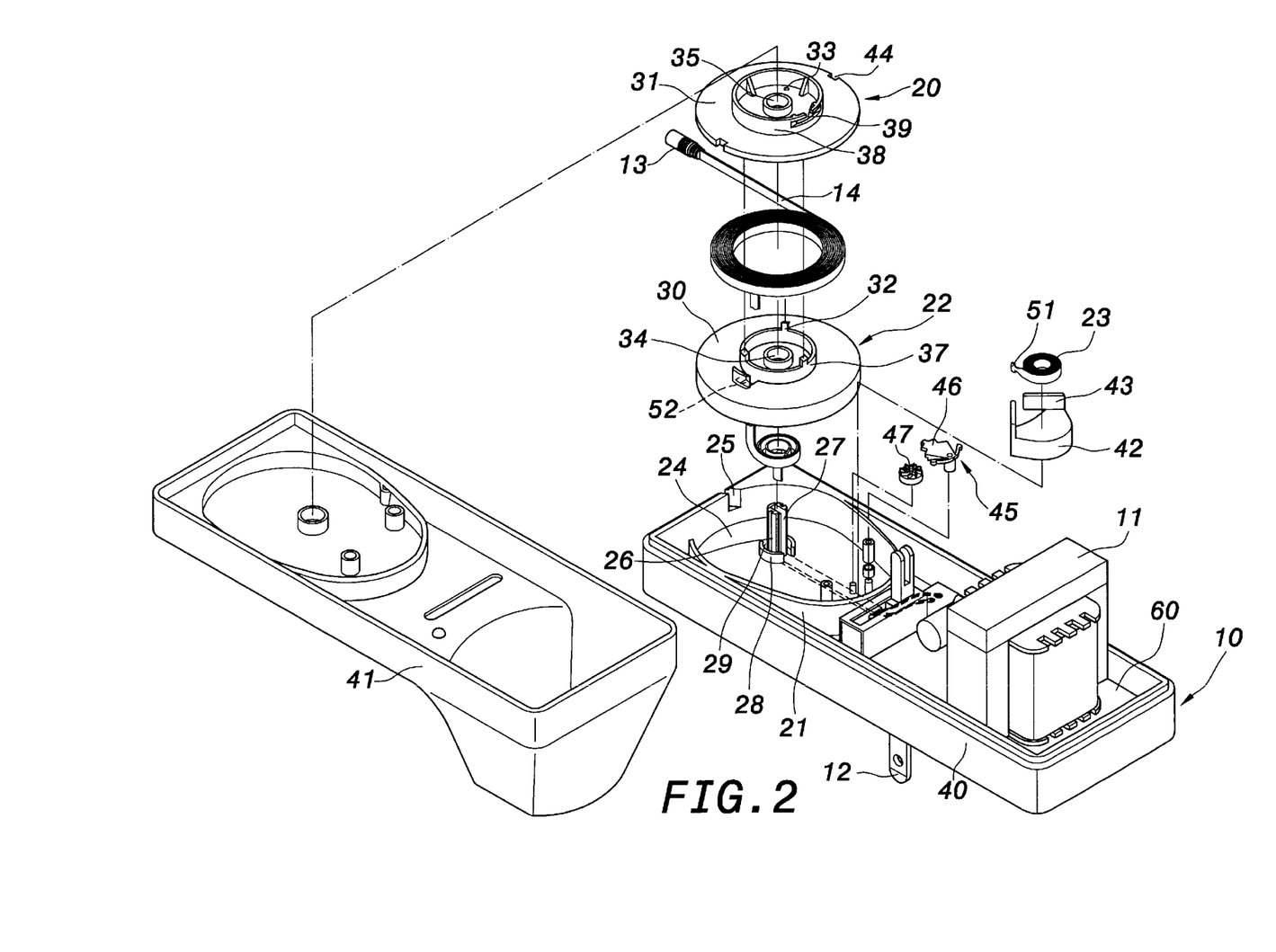
FIG. 2 is an exploded perspective view of the first embodiment of the present invention.
Figure 5:
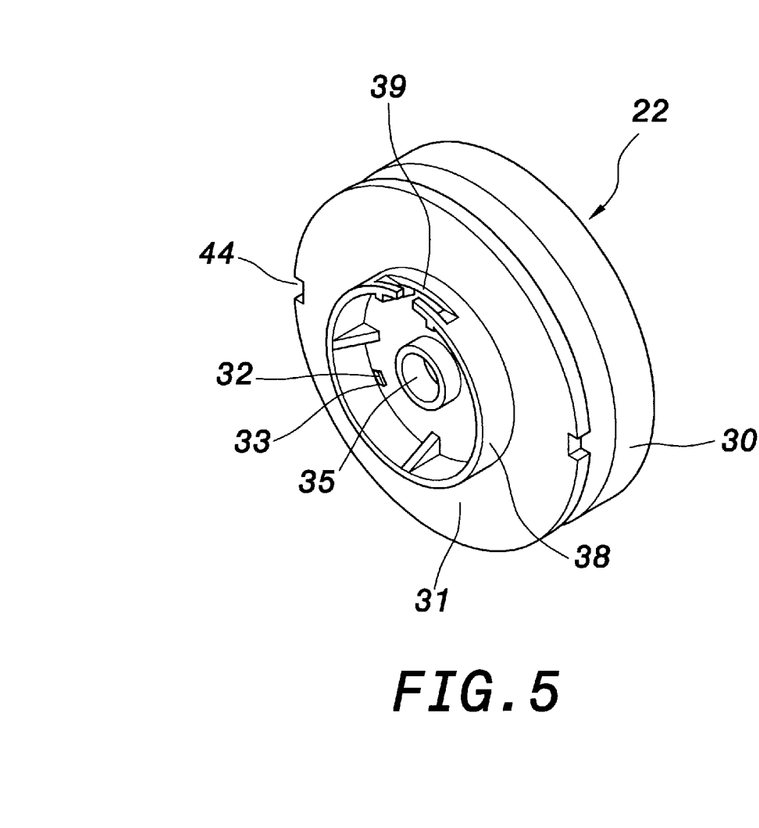
FIG. 5 is a perspective view of a wire-winding disk of the first embodiment of the present invention.
Figure 6:
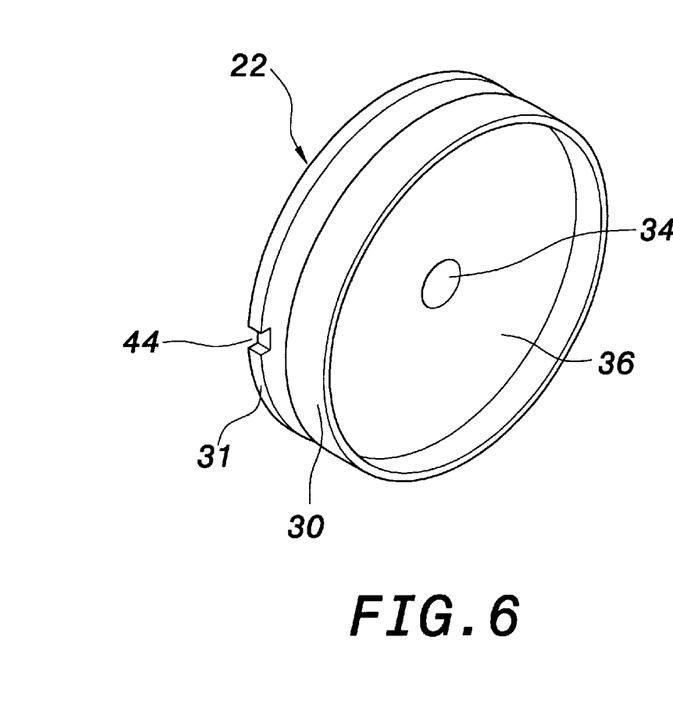
FIG. 6 is another perspective view of a wire-winding disk of the first embodiment of the present invention.

The wire-winding disk 22 comprises a first disk body 30 and a second disk body 31. The two disk bodies 30 and 31 have corresponding retaining hooks 32 and retaining holes 33 to be retained and assembled together. The two disk bodies 30 and 31 have central axial holes 34 and 35, respectively. Receiving grooves 36 and wire-winding rings 37 are disposed on two faces of the first disk body 30, respectively. The second disk body 31 has a spring-fixing post 38 thereon. The spring-fixing post 38 has a retaining hole 39 thereon. The wire-winding disk 22 is received in the wire tank 24 of the box body 21. The wire-winding disk 22 is pivotally disposed on the projective shaft 26 through the axial holes 34 and 35 so that the wire-winding disk 22 can rotate in the wire tank 24.

The power cord 14 is wound around the wire-winding rings 37 of the wire-winding disk 22. One end of the power cord 14 protrudes out of the wire hole 25 of the box body 21. The other end of the power cord 14 penetrates through a through hole 52 on the first disk body 30 of the wire-winding disk 22, and is then wound around the projective shaft 26 in the wire tank 24 and situated in the receiving groove 36 on the other face of the first disk body 30 so that the power cord 14 can be disposed around the wire-winding rings 37 and in the receiving grooves 36 on the two faces of the first disk body 30 of the wire-winding disk 22. The other end of the power cord 14 can also protrudes out of the through hole 27 of the projective shaft 26. After the power cord 14 protrudes out of the through hole 27, it can penetrates through the positioning groove 29 between the positioning element 28 and the projective shaft 26 to be clamped and positioned.

The scroll spring 23 is properly positioned in the wire tank 24 of the box body 21. A retaining end 51 of the scroll spring 23 is retaining in the retaining hole 39 of the wire-winding disk 22 so that the scroll spring 23 and the wire-winding disk 22 can be joined together. When the wire-winding disk 22 turns, the scroll spring 23 can store energy. The housing 10 comprises a first housing 40 and a second housing 41, which can be assembled together by means of retaining, screwing, or gluing. Thereby, the wire tank 24 can be closed, and the power cord 14, the wire-winding disk 22, and the scroll spring 23 assembled in the box body 21 can be properly positioned.

In practical use, a long length of the power cord 14 can be wound and received through the wire-winding mechanism 20. The power cord 14 can be pulled out directly from the wire-winding mechanism 20. A certain restoring tensile force can be kept due to the action of the scroll spring 23 on the power cord 14 so that the power cord 14 can be wound back into the voltage-transforming device successfully. Thereby, entanglement of wire due to a too-long length of external wire or inconvenience of use due to a too-short length of external wire will not arise.

Figure 3:
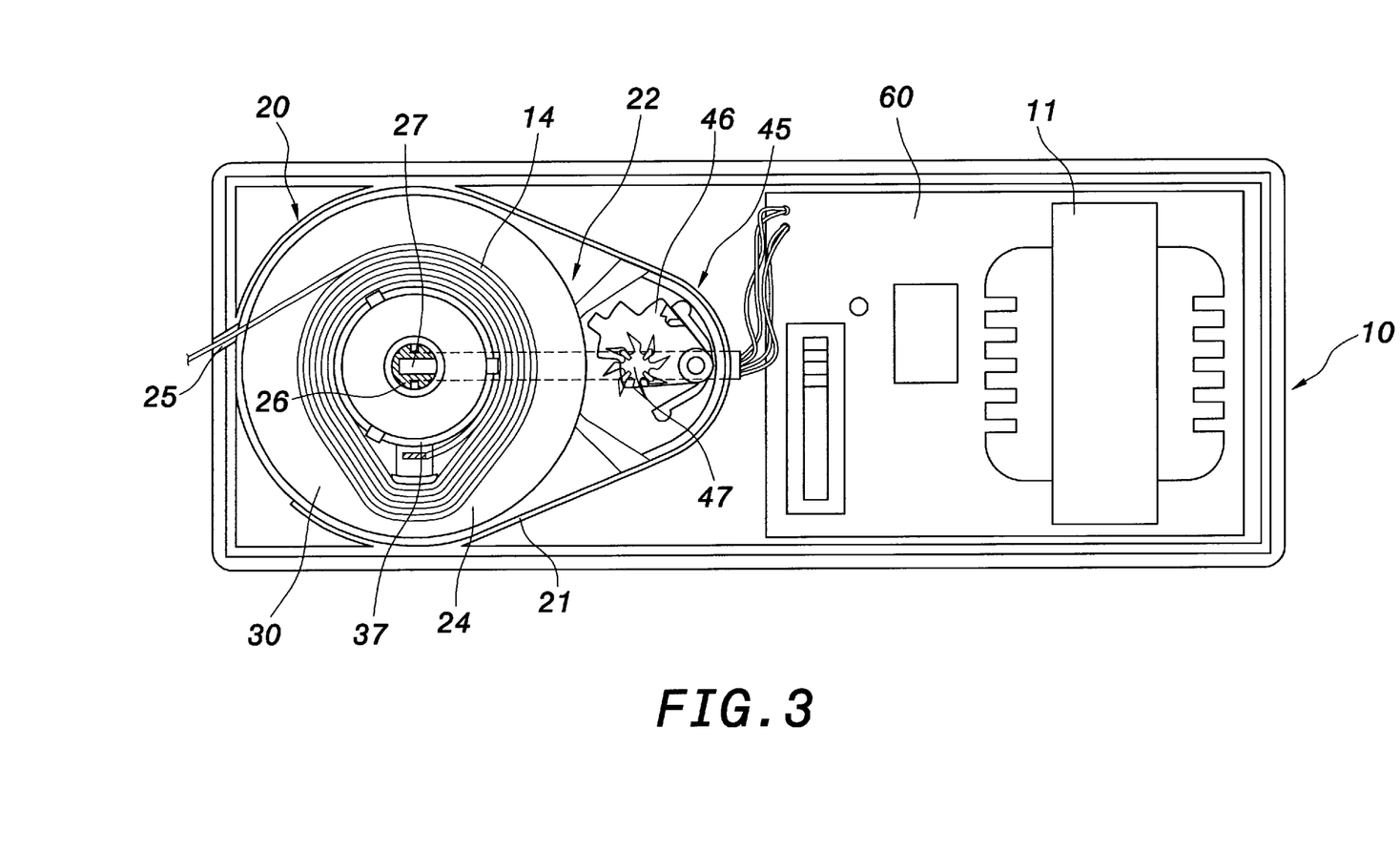
FIG. 3 is a plan view of the internal structure of the first embodiment of the present invention.
Figure 4:
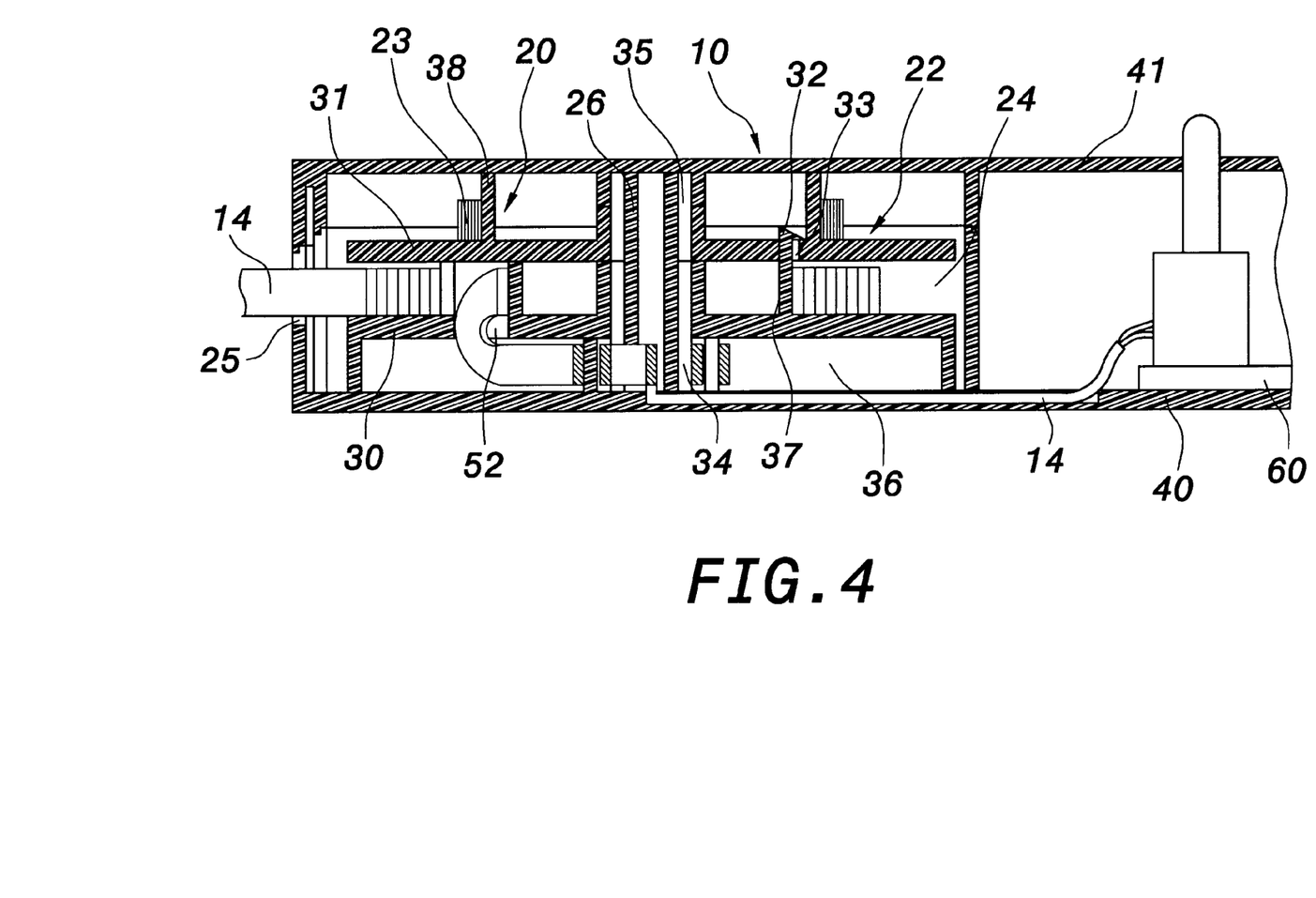
FIG. 4 is a cross-sectional view of the first embodiment of the present invention.

Moreover, a bearing seat 42 can be installed in the wire tank 24 of the box body 21. Two stop sheets 43 extend from two sides of the bearing seat 42 so that the scroll spring 23 can be placed between the stop sheets 43 and the wall of the housing 10. Furthermore, a plurality of retaining grooves 44 are formed on the peripheral edge of the wire-winding disk 22 and a reciprocating control device 45 is installed adjacent to the wire-winding disk 22 so that the user will not be disturbed due to the tensile force when he pulls out the power cord 14. The reciprocating control device 45 comprises a swing sheet 46 capable of swinging freely and a rag wheel 47 capable of rotating freely. Through the interactive functionality of the swing sheet 46, the rag wheel 47, and the retaining grooves 44 of the wire-winding disk 22, the power cord 14 can be fixed or received by winding through reciprocating actions of pull and release.

The power cord 14 is respectively disposed in the receiving grooves 36 and around the wire-winding rings 37 on two faces of the first disk body 30 of the wire-winding disk 22 so that the power cord 14 will not be affected by the receiving grooves 36 when being wound around the wire-winding rings 37 of the wire-winding disk 22. Therefore, when the power cord 14 is wound around the wire-winding disk 22, it will be less limited in space by the wire-winding disk 22, hence greatly increasing the area of use of the wire-winding mechanism to receive a longer length of the power cord 14 and thus achieving convenient use of the wire-winding mechanism.

Figure 8:
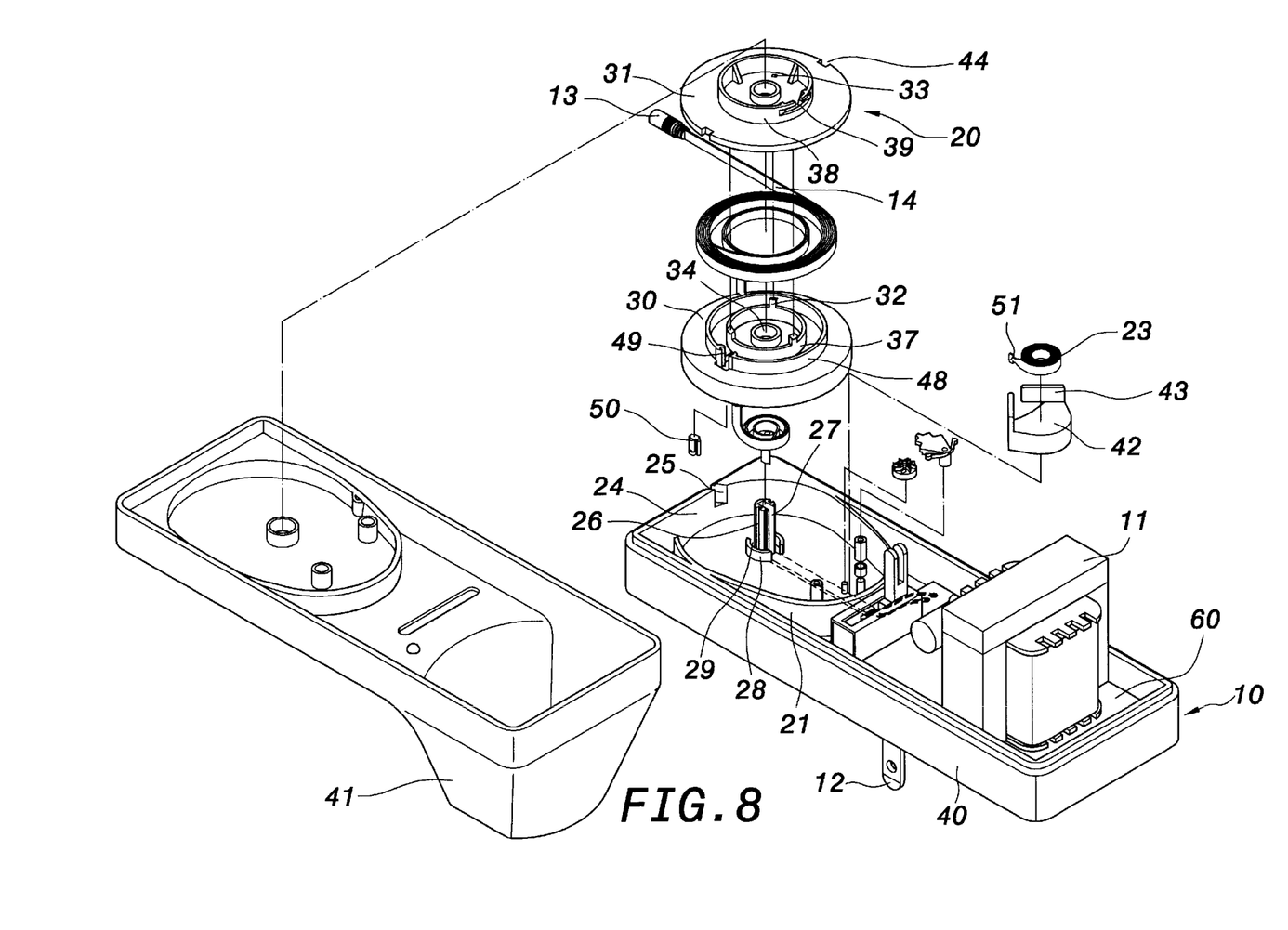
FIG. 8 is an exploded perspective view of a third embodiment of the present invention.
Figure 9:
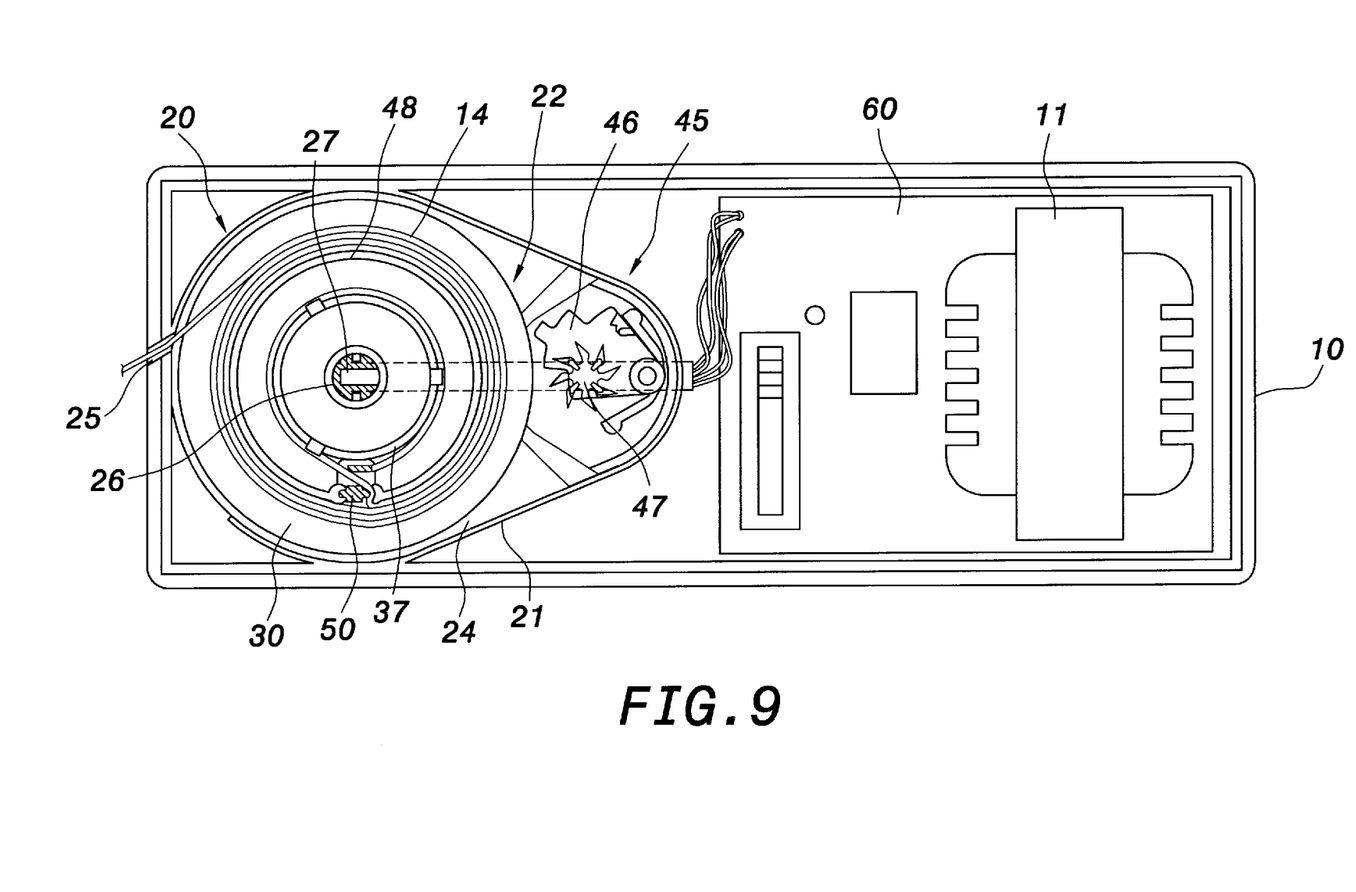
FIG. 9 is a plan view of the internal structure of the third embodiment of the present invention.

Additionally, as shown in FIGS. 8 and 9, an outer wire-winding ring 48 can be provided to surround each of the wire-winding rings 47 at a predetermined distance. The power cord 14 is also wound around the outer wire-winding rings 48. Each of the outer wire-winding rings 48 has a connected hole 49 thereon to be passed through by the power cord 14. A fixing element 50 is embedded in the connected holes 49 on the outer wire-winding rings 48. The fixing element 50 can clamp and fix the power cord 14 passing through the connected holes 50 so that the power cord 14 situated in the outer wire-winding rings 48 cannot be pulled to move. Therefore, friction between the power cord 14 and the outer wire-winding rings 48 can be avoided when the power cord 14 outside the outer wire-winding rings 48 is pulled inwards, hence effectively preventing surface breakage and damage of internal leads of the power cord 14.

Figure 10:
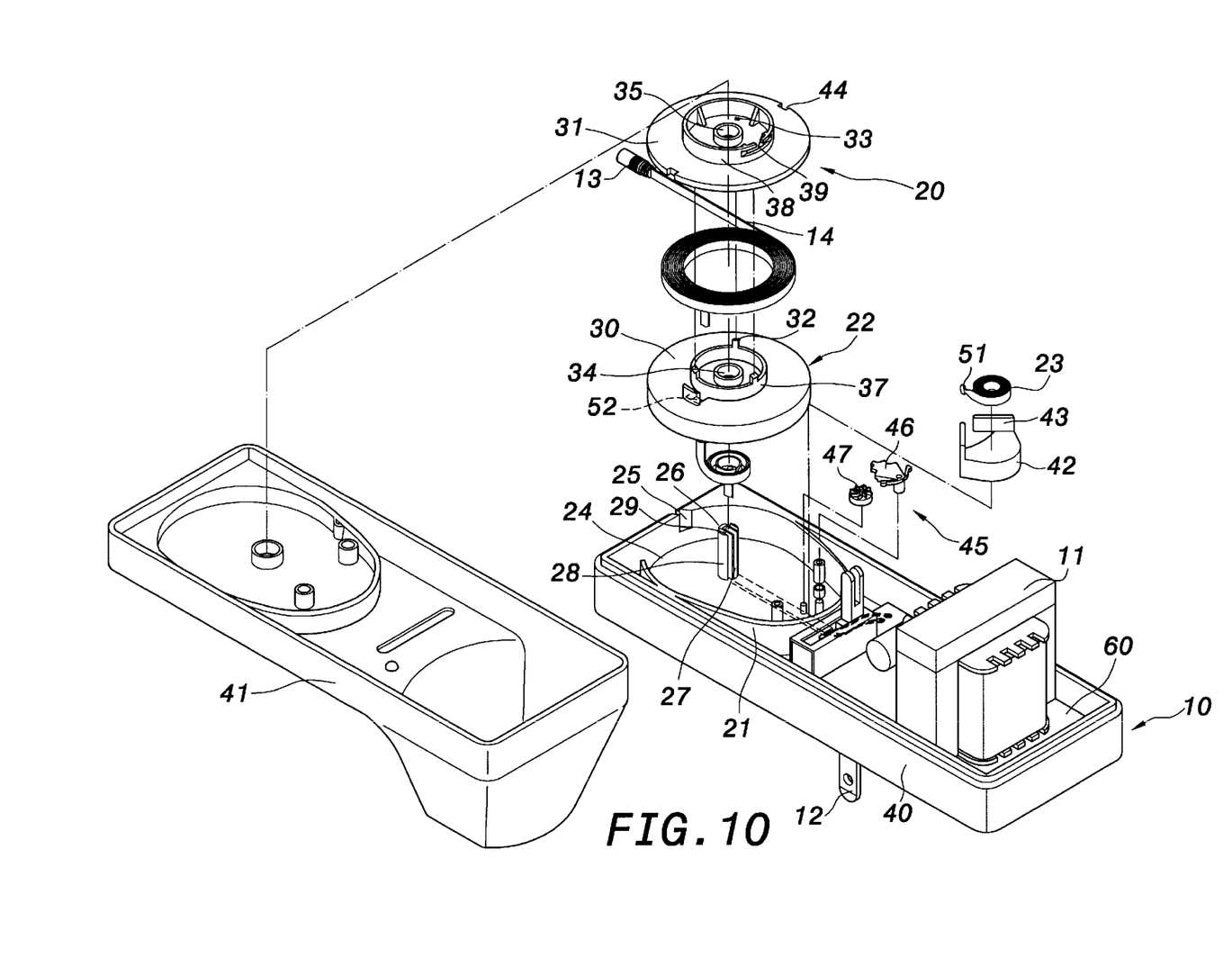
FIG. 10 is an exploded perspective view of a fourth embodiment of the present invention.
Figure 11:
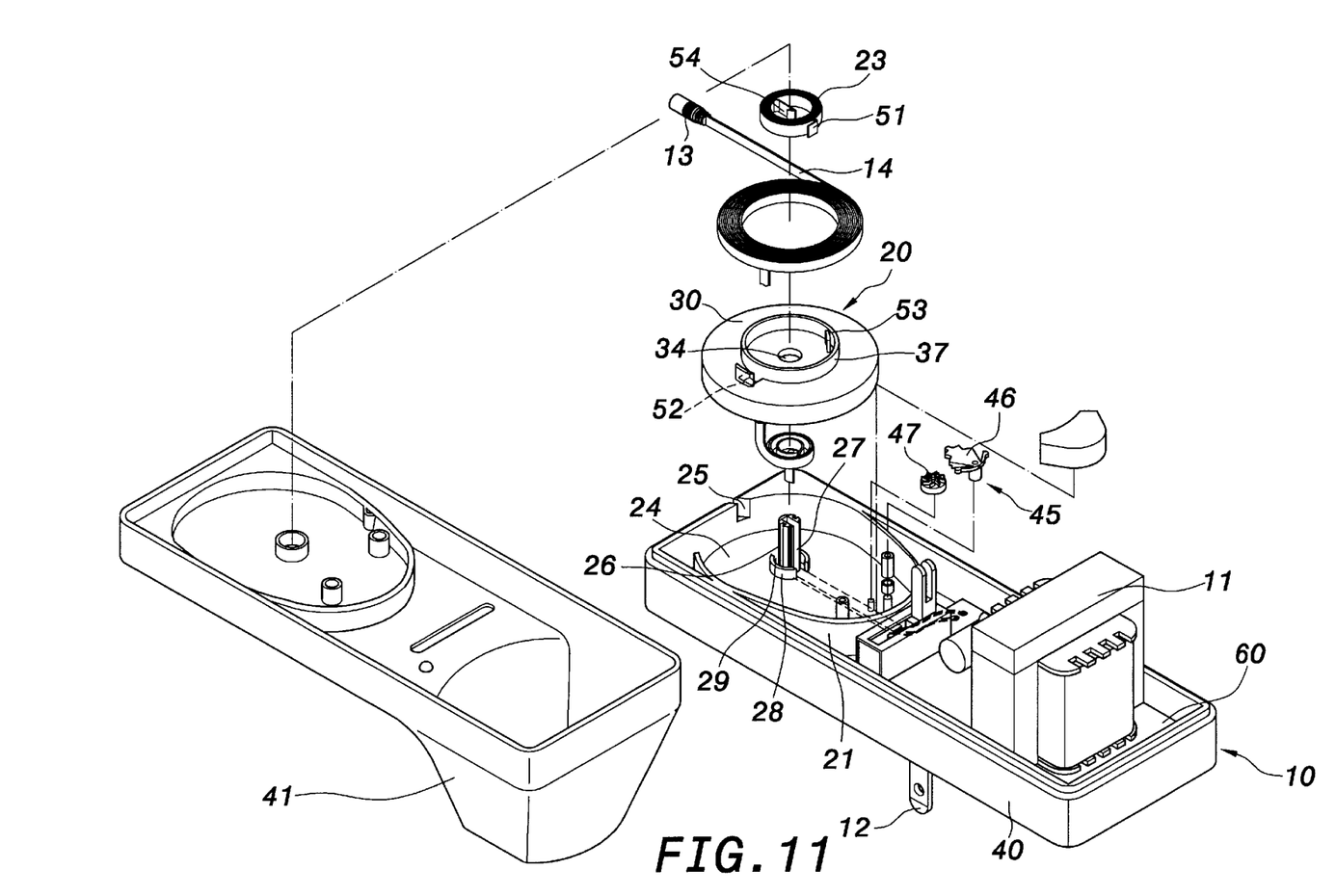
FIG. 11 is an exploded perspective view of a fifth embodiment of the present invention.

As shown in FIG. 10, the positioning element 28 at the periphery of the projective shaft 26 of the present invention can vary and can have a larger height. As shown in FIG. 11, the wire-winding disk 22 of the present invention can be composed of only the first disk body 30, the scroll spring 23 is disposed in the wire-winding ring 37 of the first disk body 30, and the retaining end 51 of the scroll spring 23 is retained with a retaining block 53 on the first disk body 30 of the wire-winding disk 22 so that the scroll spring 23 and the wire-winding disk 22 can be joined together. Another retaining end 54 of the scroll spring 23 is retained in the through groove 27 on the projective shaft 26 of the box body 21 so that the scroll spring 23 and the box body 21 can be joined together. The scroll spring 23 is joined between the box body 21 and the wire-winding disk 22 so that the scroll spring 23 can store energy when the wire-winding disk 22 rotates.

Figure 12:
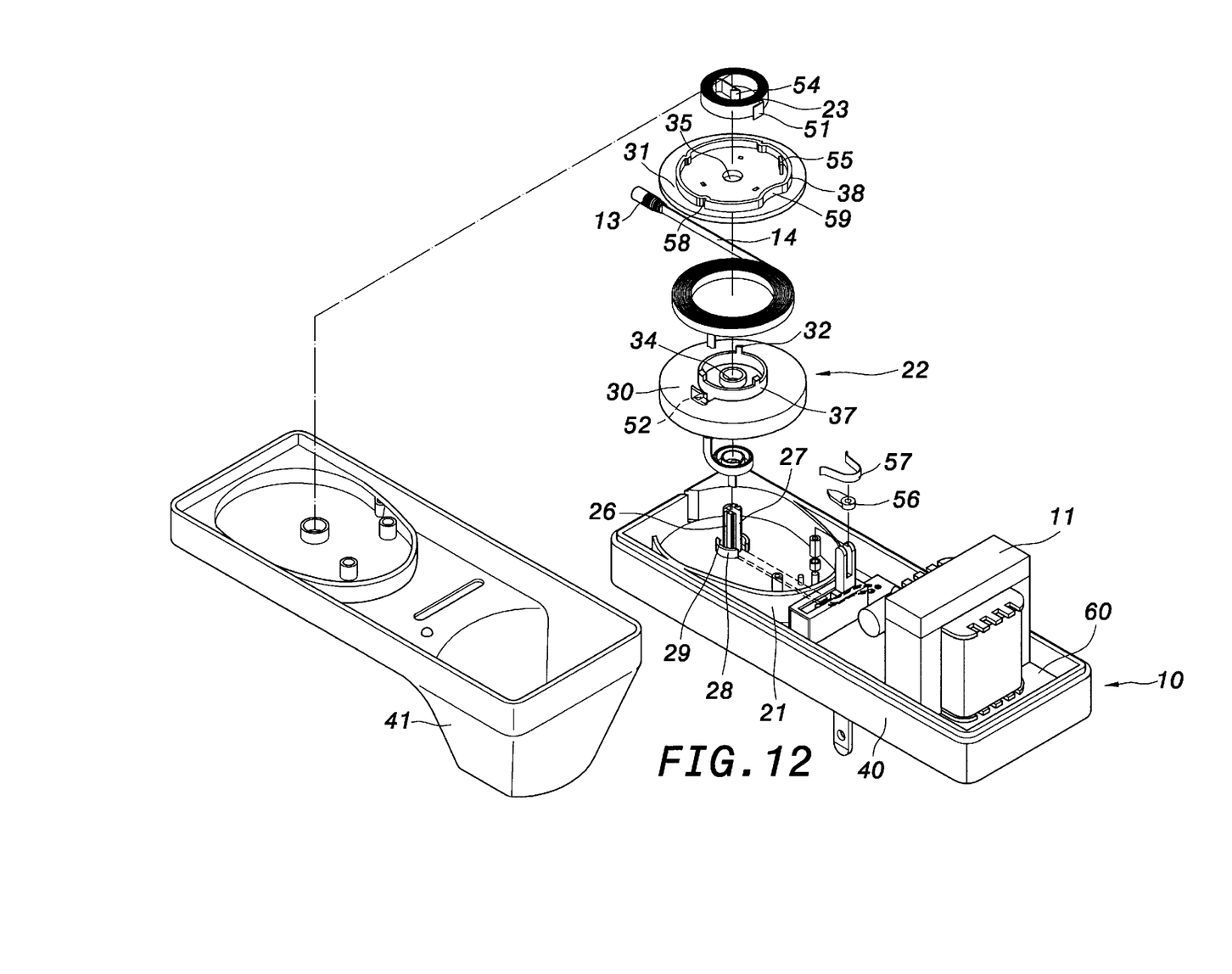
FIG. 12 is an exploded perspective view of a sixth embodiment of the present invention.
Figure 13:
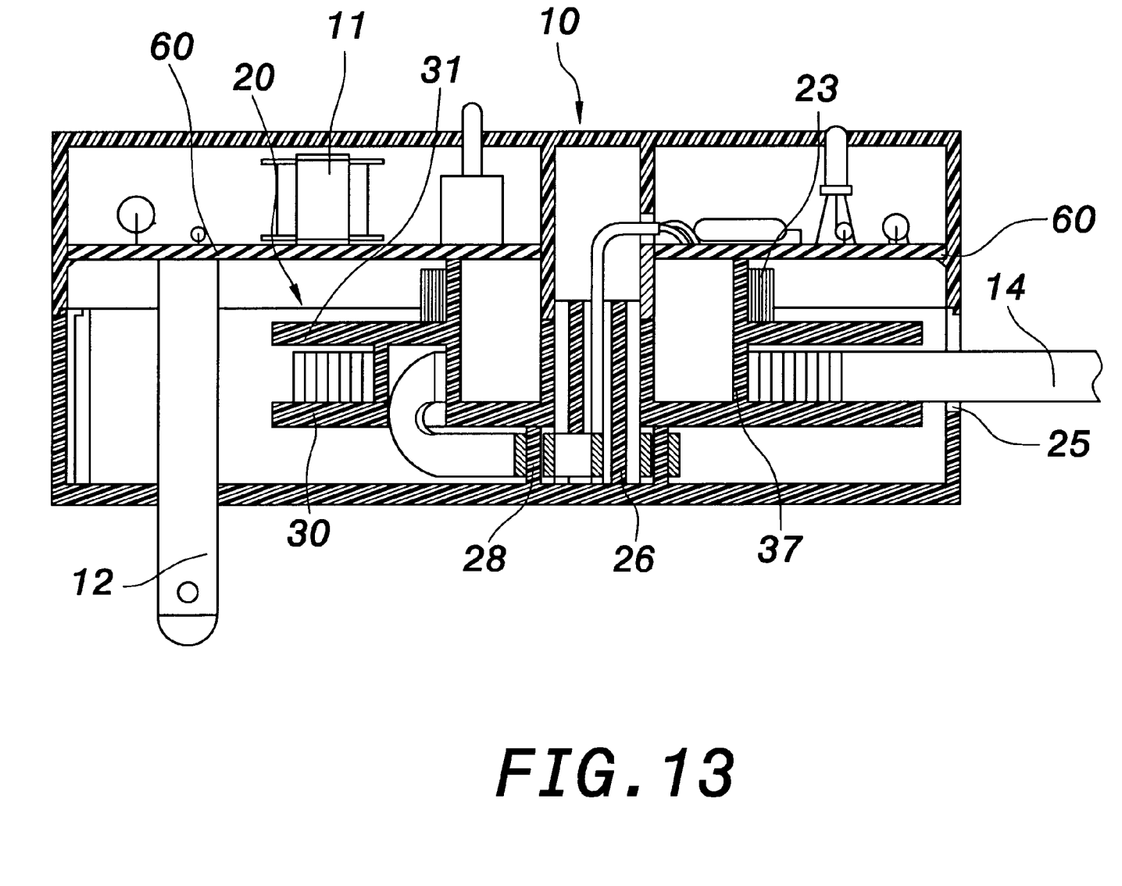
FIG. 13 is a cross-sectional view of a seventh embodiment of the present invention.

As shown in FIG. 12, the scroll spring 23 can be disposed in the spring-fixing post 38 of the second disk body 31. The retaining end 54 of the scroll spring 23 is retained with a retaining block 55 on the second disk body 31 of the wire-winding disk 22 so that the scroll spring 23 and the wire-winding disk 22 can be joined together. Another retaining end 54 of the scroll spring 23 is retained in the through groove 27 on the projective shaft 26 of the box body 21 so that the scroll spring 23 and the box body 21 can be joined together. The scroll spring 23 is joined between the box body 21 and the wire-winding disk 22 so that the scroll spring 23 can store energy when the wire-winding disk 22 rotates. As shown in FIG. 13, the structures of the voltage-transforming circuit unit 11, the circuit board 60, and the housing 10 can also vary.

Additionally, in order that a user will not be disturbed due to the tensile force when he pulls out the power cord 14, a catching block 56 capable of swinging is pivotally disposed at a side in the box body 21, a V-shaped resilient sheet 5 is embedded in the box body 21 to enclose two sides of the catching block 56, and at least a slanting retaining groove 58 and an arc-shaped gap 59 are alternately disposed at predetermined positions of the spring-fixing post 38 of the second disk body 31. When the power cord 14 is pulled out to let the wire-winding disk 22 rotate clockwise, the catching block 56 will tilt rightwards to abut against the right end of the V-shaped resilient sheet 57 due to friction with the edge of the disk body. If the wire-winding disk continues rotating, the retaining groove 58 and the gap 59 will not be retained. If the pull is stopped in time to let the scroll spring 23 rewind freely, the catching block 56 will be embedded in one of the retaining grooves 58 in time to generate catching effect. In other words, after the user pulls out the power cord 14 the required length, the length can be kept temporarily.

However, when the power cord 14 is to be rewound completely, it is only necessary to slightly pull the power cord 14 to let the arc-shaped gap 59 move to the sharp point of the catching block 59 and then release the power cord to let it be rewound freely. At this time, the catching block 56 will fall into the gap 59 and swing to the left side due to resiliency of the V-shaped resilient sheet 57 to abut against the left end of the resilient sheet 57 owing to rewinding push of the disk body. Subsequently, the retaining grooves 58 will be passed without generating catching effect so that the wire-winding disk 22 can continually and quickly rewind the power cord 14.

Figure 14:
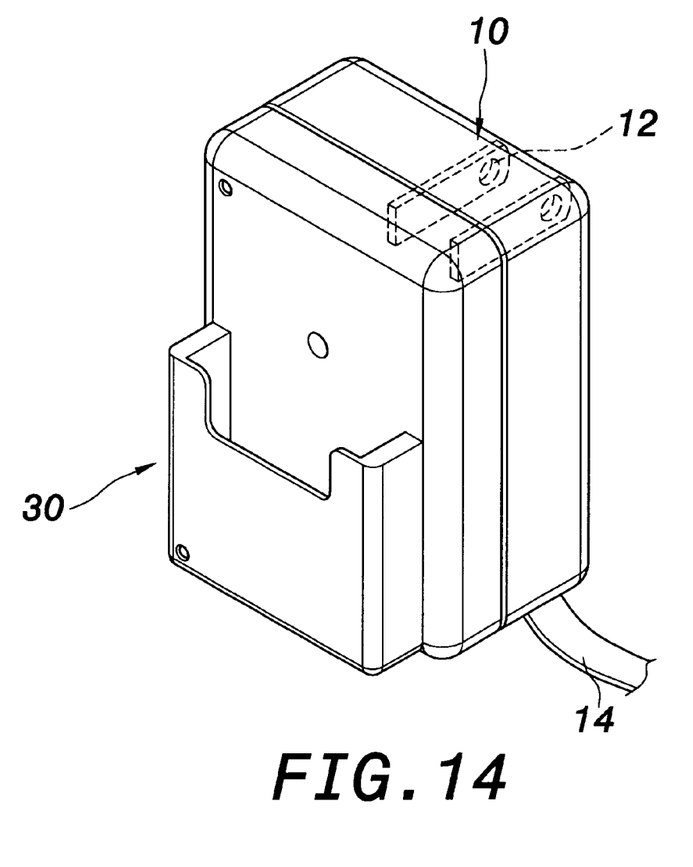
FIG. 14 is a perspective view of an eighth embodiment of the present invention.

As shown in FIGS. 13 and 14, a bearing seat 30 can be joined on the outside of the housing 10. The bearing seat 30 can be integrally formed with the housing 10, or can be separately joined on the housing 10. In this embodiment, the bearing seat 30 is integrally formed with the housing 10. The bearing seat 30 is a hollow housing. One side of the bearing seat 30 is open so that a battery can be inserted into the bearing seat 30. Contact sheets 61 electrically connected to the circuit board 60 of the voltage-transforming circuit unit 11 are disposed on the housing 10. One end of the contact sheets 60 can be bent to form V-shaped or circular arc-shaped projective connection points, which stick into the bottom inside the bearing seat 30.

Figure 15:
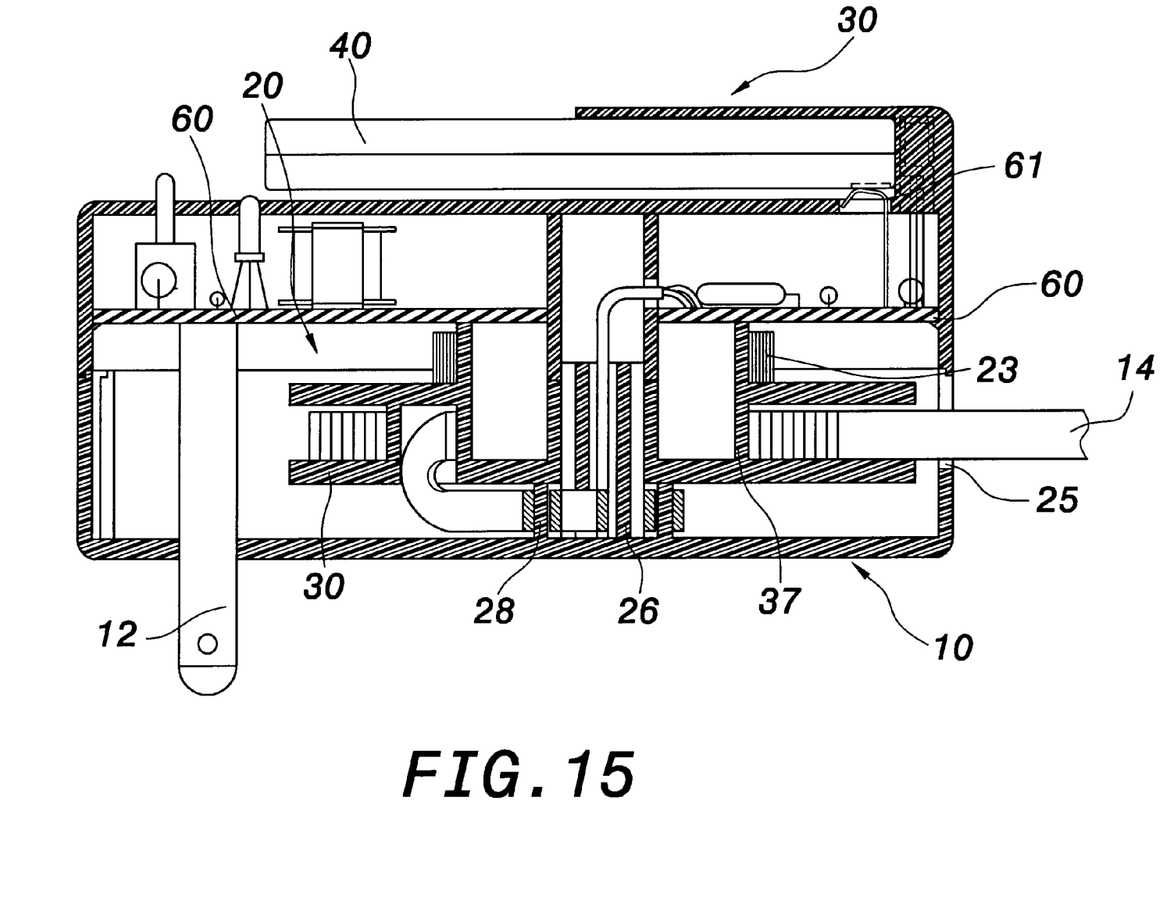
FIG. 15 is a cross-sectional view of the eighth embodiment of the present invention.

As shown in FIG. 15, when the input plug 12 is plugged into an AC socket, a DC voltage is obtained through the action of the voltage-transforming circuit unit 11, and electricity is transferred to the contact sheets 61. Therefore, when a battery 40 to be charged of a portable electronic device such as a mobile phone or a personal digital assistant (PDA) is inserted into the bearing seat 30, contact terminals at the bottom of the battery 40 can achieve electric connection with the contact sheets 61 to charge the battery 40, hence providing desktop-charging function.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A voltage-transforming device having a wire-winding mechanism, comprising:

a housing;

a voltage-transforming circuit unit disposed in said housing and connected to a power cord, and a wire-winding mechanism comprising a box body, a wire-winding disk, and a scroll spring, said box body being disposed in said housing and having a wire tank therein, a projective shaft being disposed on an inside face of said wire tank, said wire-winding disk having a first disk body, said first disk body having an axial hole, receiving grooves and wire-winding rings being respectively disposed on two faces of said first disk body, said wire-winding disk being received in said wire tank, said first disk body being pivotally disposed on said projective shaft through said axial hole, said power cord being wound around said projective shaft and situated in said receiving grooves, said power cord being also wound around said wire-winding rings so that said power cord is respectively disposed in said receiving grooves and around said wire-winding rings of the two faces of said first disk body, one end of said power cord being capable of protruding out of said box body, said scroll spring being disposed in said box body and joined with said wire-winding disk.

2. The voltage-transforming device having a wire-winding mechanism as claimed in claim 1, wherein an input terminal of said voltage-transforming circuit unit is connected to an input plug.

3. The voltage-transforming device having a wire-winding mechanism as claimed in claim 1, wherein one end of said power cord is connected to an output plug.

4. The voltage-transforming device having a wire-winding mechanism as claimed in claim 1, wherein said power cord is a flat or circular cord.

5. The voltage-transforming device having a wire-winding mechanism as claimed in claim 1, wherein said box body is integrally formed in said housing.

6. The voltage-transforming device having a wire-winding mechanism as claimed in claim 1, wherein said box body is a separate unit to be assembled in said housing.

7. The voltage-transforming device having a wire-winding mechanism as claimed in claim 1, wherein said wire-winding disk of said wire-winding mechanism further has a second disk body having an axial hole, which is pivotally disposed on said projective shaft.

8. The voltage-transforming device having a wire-winding mechanism as claimed in claim 7, wherein said first disk body and said second disk body of said wire-winding disk have corresponding retaining hooks and retaining holes to be retained and assembled together.

9. The voltage-transforming device having a wire-winding mechanism as claimed in claim 7, wherein said second disk body has a spring-fixing post thereon, said spring-fixing post having a retaining hole thereon, said scroll spring being retained in said retaining hole through a retaining end thereof so that said scroll spring and said wire-winding disk can be joined together.

10. The voltage-transforming device having a wire-winding mechanism as claimed in claim 7, wherein said second disk body has a spring-fixing post thereon, said scroll spring being disposed inside said spring-fixing post, a retaining end of said scroll spring being retained on said second disk body, another retaining end of said scroll spring being retained on said projective shaft of said box body.

11. The voltage-transforming device having a wire-winding mechanism as claimed in claim 7, wherein a catching block capable of swinging is pivotally disposed inside said box body, and a V-shaped resilient sheet enclosing two sides of said catching block is embedded in said box body, at least a slanting retaining groove and an arc-shaped gap being alternately disposed on said second disk body, said power cord being fixed or rewound through reciprocating actions of pull and release by means of interactive functionality of said retaining grooves, said gap, said catching block, and said V-shaped resilient sheet.

12. The voltage-transforming device having a wire-winding mechanism as claimed in claim 1, wherein a through hole is axially disposed on said projective shaft of said wire-winding mechanism, said through hole extending to a bottom of said wire tank and penetrating to a side adjacent to said voltage-transforming circuit unit, one end of said power cord passing through said through groove on said projective shaft and being connected to said voltage-transforming circuit unit.

13. The voltage-transforming device having a wire-winding mechanism as claimed in claim 1, wherein a positioning element is disposed at a periphery of said projective shaft of said wire-winding mechanism, and said positioning element can be used to position said power cord.

14. The voltage-transforming device having a wire-winding mechanism as claimed in claim 1, wherein a bearing seat is disposed in said wire tank of said box body of said wire-winding mechanism, and two stop sheets extend from two sides of said bearing seat so that said scroll spring can be received between said bearing seat and a wall of said housing.

15. The voltage-transforming device having a wire-winding mechanism as claimed in claim 1, wherein a plurality of retaining grooves are disposed on a peripheral edge of said wire-winding disk of said wire-winding mechanism, and a reciprocating control device is disposed adjacent to said wire-winding disk, said reciprocating control device comprising a swing sheet capable of swinging freely and a rag wheel capable of rotating freely, said swing sheet and said rag wheel being matched with said retaining grooves of said wire-winding disk.

16. The voltage-transforming device having a wire-winding mechanism as claimed in claim 1, wherein an outer wire-winding ring is provided to surround each of said wire-winding rings of said wire-winding mechanism, said power cord being wound around said outer wire-winding rings, each of said outer wire-winding rings having a connected hole thereon to be passed through by said power cord, a fixing element being embedded in said connected hole to clamp and fix said power cord passing through said connected hole.

17. The voltage-transforming device having a wire-winding mechanism as claimed in claim 1, wherein said scroll spring of said wire-winding mechanism is disposed inside said wire-winding rings of said first disk body, a retaining end of said scroll spring being retained on said first disk body, another retaining end of said scroll spring being retained on said projective shaft of said box body.

18. The voltage-transforming device having a wire-winding mechanism as claimed in claim 1, wherein a bearing seat is joined on an outside of said housing, said housing having connection sheets electrically connected to said voltage-transforming circuit unit, one end of said connection sheets sticking into said bearing seat.

* * * * *